US012639840B2

(12) United States Patent
Lee et al.

(10) Patent No.: US 12,639,840 B2
(45) Date of Patent: May 26, 2026

(54) METHOD FOR GENERATING GROUND TRUTH DATA AND A METHOD AND APPARATUS FOR ESTIMATING A VANISHING POINT USING THE SAME

(71) Applicants: HYUNDAI MOTOR COMPANY, Seoul (KR); KIA CORPORATION, Seoul (KR)

(72) Inventors: Jung Hyun Lee, Seoul (KR); Tae Hun Lim, Seoul (KR); Dong Hoon Koo, Seoul (KR); Young Hyun Kim, Seoul (KR)

(73) Assignees: HYUNDAI MOTOR COMPANY, Seoul (KR); KIA COPORATION, Seoul (KR)

( * ) Notice: Subject to any disclaimer, the term of this patent is extended or adjusted under 35 U.S.C. 154(b) by 267 days.

(21) Appl. No.: 18/517,255

(22) Filed: Nov. 22, 2023

(65) Prior Publication Data

US 2025/0037290 A1      Jan. 30, 2025

(30) Foreign Application Priority Data

Jul. 28, 2023     (KR) ........................ 10-2023-0099152

(51) Int. Cl.
*G06T 7/536*          (2017.01)
*G06T 7/55*           (2017.01)

(52) U.S. Cl.
CPC ................ *G06T 7/536* (2017.01); *G06T 7/55* (2017.01); *G06T 2207/20084* (2013.01)

(58) Field of Classification Search
CPC . G06T 2207/20081; G06T 2207/20084; G06T 2207/30244; G06T 7/536; G06T 7/55; G06T 7/73; G06T 3/00; G06T 7/00; G06T 9/00; G06T 5/00; G06T 11/00; G06T 15/00; G06T 17/00; G06T 19/00; G06T 2201/00; G06T 2207/00; G06T 2210/00;

(Continued)

(56) References Cited

U.S. PATENT DOCUMENTS 11,138,751 B2 * 10/2021 Guizilini ............. G06N 3/0455
2011/0164789 A1 * 7/2011 Robert ................... G06V 10/44
                                                              382/104

(Continued)

OTHER PUBLICATIONS

Razvan Itu et al., "A Self-Calibrating Probabilistic Framework for 3D Environment Perception Using Monocular Vision," Feb. 27, 2020, Sensors,20, 1280, pp. 1-23.*

(Continued)

*Primary Examiner* — Omar S Ismail
(74) *Attorney, Agent, or Firm* — Lempia Summerfield Katz LLC

(57)          ABSTRACT

A method and an apparatus for estimating a vanishing point are provided. The method includes receiving an input image and estimating a vanishing point for the input image, using an artificial intelligence network pre-trained by vanishing point ground truth (GT) data generated based on real image data. Estimating the vanishing point includes estimating a depth map or an optical flow map for the input image, estimating a gradient map for the depth map or the optical flow map, and estimating the vanishing point for the input image based on the gradient map and a predetermined reference gradient map.

15 Claims, 13 Drawing Sheets

(58) Field of Classification Search
CPC ............. G06T 2211/00; G06T 2215/00; G06T
2219/00
See application file for complete search history.

(56) References Cited

U.S. PATENT DOCUMENTS

| 2019/0108399 A1* | 4/2019 | Escorcia | ................. | G06V 10/82 |
| 2019/0139319 A1* | 5/2019 | Eisenmann | ............. | G06T 19/20 |
| 2019/0266418 A1* | 8/2019 | Xu | ........................ | G06V 10/764 |
| 2020/0242804 A1* | 7/2020 | Eisenmann | ............... | G06T 7/80 |
| 2020/0265590 A1* | 8/2020 | Daniilidis | .............. | G06N 3/088 |
| 2021/0279950 A1* | 9/2021 | Phalak | ................... | G06F 18/231 |
| 2022/0066544 A1* | 3/2022 | Kwon | ..................... | G06T 7/251 |
| 2023/0194407 A1* | 6/2023 | Lebel | ................... | G01N 15/147 |
| | | | | 382/134 |
| 2023/0351769 A1* | 11/2023 | Wu | ....................... | G06V 10/762 |
| 2024/0087151 A1* | 3/2024 | Guizilini | ................... | G06T 7/55 |

OTHER PUBLICATIONS

Hakki Motorcu et al., "HM-Net: A Regression Network for Object
Center Detection and Tracking on Wide Area Motion Imagery," Jan.
6, 2022, IEEEAccess, vol. 10,2022, pp. 1346-1357.*
Viktor Kocur et al., "Detection of 3D bounding boxes of vehicles
using perspective ransformation for accurate speed measurement,"
Sep. 4, 2020, Machine Vision and Applications (2020) 31:62, pp.
1-11.*
Junjie Hu et al., "Deep Depth Completion From Extremely Sparse
Data: A Survey ," Dec. 14, 2022, IEEE Transactions On Pattern
Analysis and Machine Intelligence, vol. 45, No. 7, Jul. 2023, pp.
8244-8255.*
Ahmed Ali et al., "Real-time vehicle distance estimation using
single view geometry," Mar. 2020, Proceeding of the IEEE/CVF
Winter Conference on Applications of Computer Vision (WACV),
2020, pp. 1111-1117.*
Yin-Bo Liu et al., "Unstructured Road Vanishing Point Detection
Using Convolutional Neural Networks and Heatmap Regression,"
Aug. 27, 2020, IEEE Transactions On Instrumentation and Mea-
surement, vol. 70, 2021, pp. 1-6.*
Yu Huang et al., "Autonomous Driving with Deep Learning: A
Survey of State-of-Art Technologies , " Jul. 4, 2020, arXiv: 2006.
06091.omputer Science > Computer Vision and Pattern Recogni-
tion, pp. 1-10.*
Efstratios Kakaletsis et al., "Computer Vision for Autonomous UAV
Flight Safety: An Overview and a Vision-based Safe Landing
Pipeline Example," Oct. 2021, ACM Computing Surveys, vol. 54,
No. 9, Article 181., pp. 181:1-181:8.*
Fengyun Cao, "Depth Estimation of Single Defocused Images
Based on Multi-Feature Fusion," Aug. 30, 2021, Traitement du
Signal, Oct. 2021, vol. 38 Issue 5, pp. 1353-1358.*
S M Ali Musa Kazmi et al., "Exploiting a Scene Calibration
Mechanism for Depth Estimation," Feb. 25, 2013, 2012 3rd Inter-
national Conference on Image Processing Theory, Tools and Appli-
cations (IPTA), pp. 1-4.*

* cited by examiner 110    120

R = 4

Gaussian Kernel

610

COLOR: VECTOR DIRECTION OF OPTICAL FLOW
CONCENTRATION: STRENGTH OF OPTICAL FLOW

800

METHOD FOR GENERATING GROUND TRUTH DATA AND A METHOD AND APPARATUS FOR ESTIMATING A VANISHING POINT USING THE SAME

CROSS-REFERENCE TO RELATED APPLICATION

This application claims the benefit of priority to Korean Patent Application No. 10-2023-0099152, filed in the Korean Intellectual Property Office on Jul. 28, 2023, the entire contents of which are incorporated herein by reference.

TECHNICAL FIELD

The present disclosure relates to technologies of generating a vanishing point ground truth (GT) and estimating a vanishing point using the same. More particularly, the present disclosure relates to a method and an apparatus for generating vanishing point GT of real data (or real image data) and training an artificial intelligence network using the vanishing point GT to improve the accuracy of estimating a vanishing point for an input image.

BACKGROUND

There is a need for several image recognition technologies for operation of an autonomous vehicle. As an example, identifying a line while driving and identifying a vanishing point are one of important elements.

The vanishing point indicates a point at which projected straight lines meet at one point on a two-dimensional (2D) plane, when parallel straight lines extend infinitely in three-dimensional (3D) space and are projected onto the 2D plane. As an example, using the detection of the vanishing point, vanishing points in three orthogonal directions and a vanishing line may be obtained to analyze an architectural structure and analyzing a building again. A vanishing point may be detected in 3D conversion of a 2D image including an architectural structure to generate a depth map. This is because it is possible to perform relative depth estimation because a portion where the vanishing point is located while a 3D space is converted into a 2D image corresponds to the furthest place in the image.

Vanishing point information is a criterion of lane detection in an autonomous vehicle or an important basis to analyze location information in an autonomous driving system, such as a robot. This is because it is able to connect important edges connected from the vanishing points and detect a road.

A conventional technique for detecting a vanishing point and a vanishing line is to detect a vanishing point and a vanishing line using a computer vision (CV) technique. However, because there is a need to detect a straight line when the CV technique is used, there are constraints influenced by a driving environment.

SUMMARY

The present disclosure has been made to solve the above-mentioned problems occurring in the prior art while advantages achieved by the prior art are maintained intact.

Aspects of the present disclosure provide a method and an apparatus for generating vanishing point ground truth (GT) of real data and training an artificial intelligence network using the vanishing point GT to improve the accuracy of estimating a vanishing point for an input image.

Another aspect of the present disclosure provides a technology for generating vanishing point GT of real data.

Another aspect of the present disclosure provides a technology for training an artificial intelligence, for example, CenterNet, using vanishing point GT of real data and estimating a vanishing point for an input image using the CenterNet.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a method for estimating a vanishing point may include receiving an input image and estimating a vanishing point for the input image, using an artificial intelligence network pre-trained by vanishing point ground truth (GT) data generated based on real image data. Estimating the vanishing point may include estimating a depth map or an optical flow map for the input image. Estimating the vanishing point may also include estimating a gradient map for the depth map or the optical flow map. Estimating the vanishing point may also include estimating the vanishing point for the input image based on the gradient map and a predetermined reference gradient map.

According to an embodiment, estimating the vanishing point may include estimating a heat map for a static object based on the gradient map and the predetermined reference gradient map and estimating the vanishing point based on the heat map.

According to an embodiment, estimating the vanishing point may include performing two-dimensional (2D) Gaussian fitting of the heat map for the static object and estimating a center point of 2D Gaussian as the vanishing point.

According to an embodiment, the artificial intelligence network may include a network for estimating a keypoint corresponding to the vanishing point in the heat map.

According to an embodiment, estimating the depth map or the optical flow map may include detecting at least one predetermined dynamic object from the input image and estimating a depth map of a static object except for an area of the detected at least one predetermined dynamic object, when estimating the depth map.

According to an embodiment, the artificial intelligence network may include CenterNet.

In addition, the method may further include generating the predetermined reference gradient map. Generating the reference gradient map may include generating a reference space where there is only a static object and a reference vanishing point. Generating the reference gradient map may also include generating a reference depth map or a reference optical flow map based on the reference space and the reference vanishing point. Generating the reference gradient map may also include generating a gradient map for the reference depth map or the reference optical flow map to generate the predetermined reference gradient map.

According to an embodiment, the vanishing point GT data may be generated based on a heat map and a keypoint, when a depth map or an optical flow map for an image is generated, when a gradient map for the depth map or the optical flow map is generated, when the heat map for the gradient map is generated by means of Gaussian fitting of the gradient map and the keypoint is generated using a Gaussian center point by means of the Gaussian fitting, and when coordinates for the Gaussian center point are identical to coordinates of a vanishing point detected by at least one predetermined vanishing point detection technique.

According to another aspect of the present disclosure, an apparatus for estimating a vanishing point may include a receiver that receives an input image and an estimation device that estimates a vanishing point for the input image, using an artificial intelligence network pre-trained by vanishing point GT data generated based on real image data. The estimation device may estimate a depth map or an optical flow map for the input image, may estimate a gradient map for the depth map or the optical flow map, and may estimate the vanishing point for the input image based on the gradient map and a predetermined reference gradient map.

According to an embodiment, the estimation device may estimate a heat map for a static object based on the gradient map and the predetermined reference gradient map and may estimate the vanishing point based on the heat map.

According to an embodiment, the estimation device may perform 2D Gaussian fitting of the heat map for the static object and may estimate a center point of 2D Gaussian as the vanishing point.

According to an embodiment, the artificial intelligence network may include a network for estimating a keypoint corresponding to the vanishing point in the heat map.

According to an embodiment, the estimation device may detect at least one predetermined dynamic object from the input image and may estimate a depth map of a static object except for an area of the detected at least one predetermined dynamic object, when estimating the depth map.

According to an embodiment, the artificial intelligence network may include CenterNet.

In addition, the apparatus may further include a generator that generates the predetermined reference gradient map. The generator may generate a reference space where there is only a static object and a reference vanishing point. The generator may also generate a reference depth map or a reference optical flow map based on the reference space and the reference vanishing point. The generator may also generate a gradient map for the reference depth map or the reference gradient map to generate the reference gradient map.

According to an embodiment, the vanishing point GT data may be generated based on a heat map and a keypoint, when a depth map or an optical flow map for an image is generated, when a gradient map for the depth map or the optical flow map is generated, when the heat map for the gradient map is generated by means of Gaussian fitting of the gradient map and the keypoint is generated using a Gaussian center point by means of the Gaussian fitting, and when coordinates for the Gaussian center point are identical to coordinates of a vanishing point detected by at least one predetermined vanishing point detection technique.

According to another aspect of the present disclosure, a method for generating vanishing point ground truth (GT) may include generating a depth map or an optical flow map for an input image. The method may also include generating a gradient map for the depth map or the optical flow map. The method may also include generating a heat map for the gradient map by means of Gaussian fitting of the gradient map and generating a keypoint using a Gaussian center point by means of the Gaussian fitting. The method may also include generating the vanishing point GT based on the heat map and the key point, when coordinates for the Gaussian center point are identical to coordinates of a vanishing point detected by at least one predetermined vanishing point detection technique.

According to an embodiment, the input image may include real image data.

The features briefly summarized above with respect to the present disclosure are merely exemplary aspects of the detailed description of the present disclosure, which is described below, and do not limit the scope of the present disclosure.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1A:
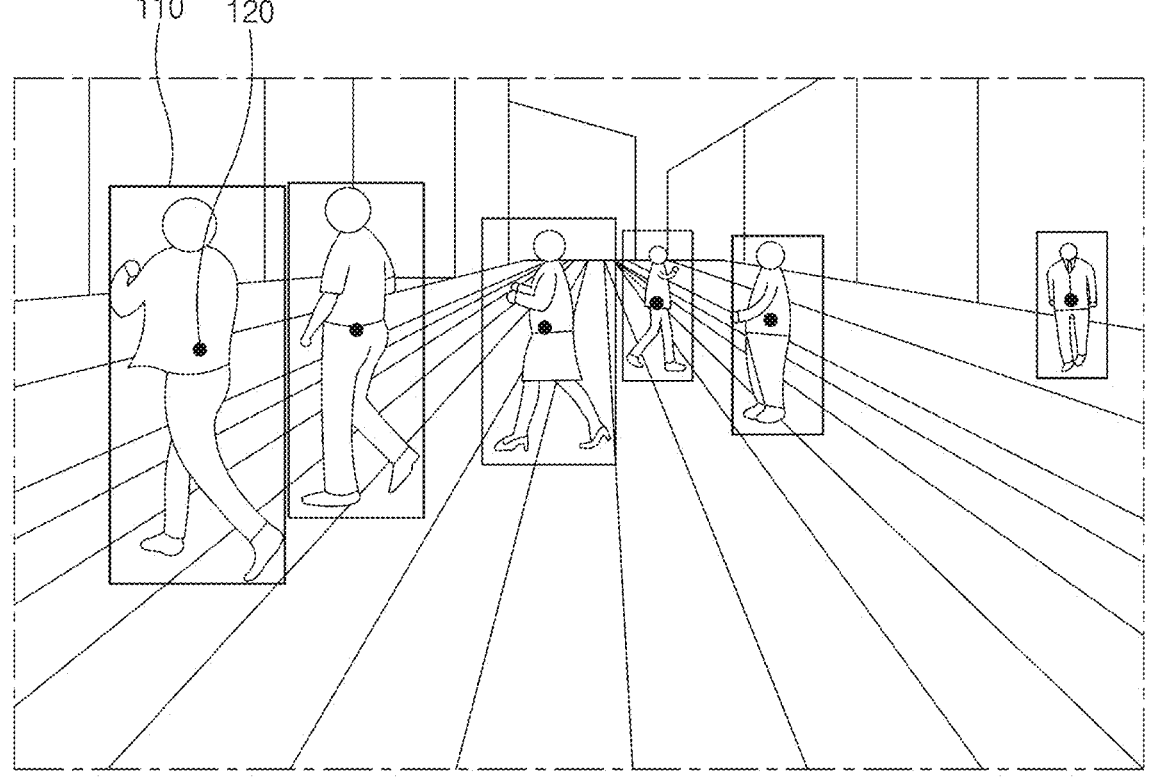
FIGS. 1A and 1B illustrate an example for describing CenterNet.

Hereinafter, an embodiment of the present disclosure is described more fully with reference to the accompanying drawings, which may be easily understood by one having ordinary skill in the art. However, the present disclosure may be embodied in many different forms and should not be construed as being limited to the embodiment set forth herein.

In describing an embodiment of the present disclosure, where it has been determined that a detailed description of a well-known configuration or function may obscure the gist of the present disclosure, a detailed description thereof has been omitted. Parts not related to the description of the present disclosure are omitted in the drawings, and similar parts are denoted by similar numerals reference throughout the specification.

In the present disclosure, when one component is referred to as being "connected with" or "coupled to" another component, it includes not only a case where the component is directly connected to another component but also a case where the components is indirectly connected with another component and there are other devices in between. In addition, when one component is referred to as "comprising", "including", or "having" another component, it means that the component may further include other components without excluding other components as long as there is no contrary description.

In the present disclosure, the terms, such as "first" and "second", are used only for the purpose of distinguishing one component from another and do not limit an order, the importance, or the like of components unless specifically stated. Thus, a first component in an embodiment may be referred to as a second component in another embodiment in the scope of the present disclosure. Likewise, a second component in an embodiment may be referred to as a first component in another embodiment.

In the present disclosure, components, which are distinguished from each other, are only for clearly explaining each feature and do not necessarily mean that the components are separated. In other words, a plurality of components may be integrated to form a single hardware or software unit, or a single component may be distributed to form a plurality of hardware or software units. Thus, even if not specifically mentioned, the integrated or separate embodiments are also included in the scope of the present disclosure.

In the present disclosure, components described in various embodiments may not necessarily refer to essential components, and some components may be selective components. Thus, an embodiment composed of a subset of components described in an embodiment is also included in the scope of the present disclosure. Thus, an embodiment, which additionally includes another component in components described in various embodiments, is also included in the scope of the present disclosure.

In the present disclosure, expressions of positional relationships used in the specification, such as for example, top, bottom, left, and right, are described for convenience of description. When viewing the drawings illustrated in the present disclosure in reverse, the positional relationship described in the present disclosure may be interpreted in the opposite way. When a component, device, element, or the like of the present disclosure is described as having a purpose or performing an operation, function, or the like, the component, device, or element should be considered herein as being "configured to" meet that purpose or perform that operation or function.

In the present disclosure, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases.

Figure 1B:
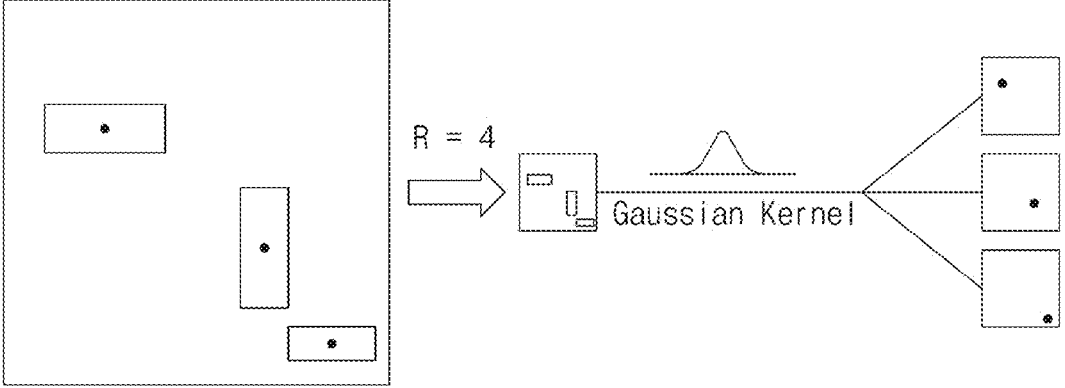

FIGS. 1A and 1B illustrate an example for describing CenterNet. Embodiments of the present disclosure may generate vanishing point ground truth (GT) data based on real image data and may train an artificial intelligence network, for example, CenterNet, which is a keypoint estimation network, using the vanishing point GT data. The embodiments of the present disclosure may estimate a vanishing point for an input image using the CenterNet to improve the accuracy of estimating the vanishing point for the input image.

Embodiments of the present disclosure may train a keypoint estimation network for estimating a keypoint using vanishing point GT data generated based on real image data and thus improve the accuracy of estimating a vanishing point of an image in a real field.

A vanishing point estimation technique in the present disclosure may use the keypoint estimation network trained by the vanishing point GT data generated based on the real image data and is described as CenterNet for convenience of description in the detailed description below. However, the keypoint estimation network is not limited or restricted to the CenterNet and may include all types of keypoint estimation networks capable of estimating a keypoint.

First of all, the CenterNet is briefly described below. The CenterNet may be a network, which uses three pairs of feature points to improve a disadvantage of CornerNet for predicting a bounding box using two pairs of feature points. The CenterNet may predict a bounding box using left upper end, right lower end, and center point information. For example, as shown in FIG. 1A, the CenterNet may be composed of a bounding box 110 and a center point 120.

As shown in FIG. 1B, the bounding box 110 and the center point 120 may be expressed as a Gaussian kernel. For example, the bounding box 110 may be expressed as the Gaussian kernel, and the center point 120 may be expressed as a peak point of the Gaussian kernel.

Thus, the bounding box 110 should change to 2D Gaussian to train the CenterNet. Because the vanishing point does not have the concept of the bounding box, embodiments of the present disclosure may generate 2D Gaussian in which the vanishing point is a center point and may train the CenterNet using the 2D Gaussian to estimate the vanishing point using the CenterNet.

Because training data for training a network, i.e., vanishing point GT data is generated using simulation data in an existing technology, it is difficult to actually apply the vanishing point GT data to a real field.

A technology according to an embodiment of the present disclosure may generate vanishing point GT data based on real image data and may train the CenterNet by using the vanishing point GT data based on the real image data as training data. Thus, the technology may apply the vanishing point GT data to a real field to estimate a vanishing point.

In other words, the CenterNet in an embodiment of the present disclosure may train 2D Gaussian of the vanishing point GT data to estimate a vanishing point for an input image.

A description is given below of a process of generating the vanishing point GT data based on the real image data with reference to FIG. 2.

Figure 2:
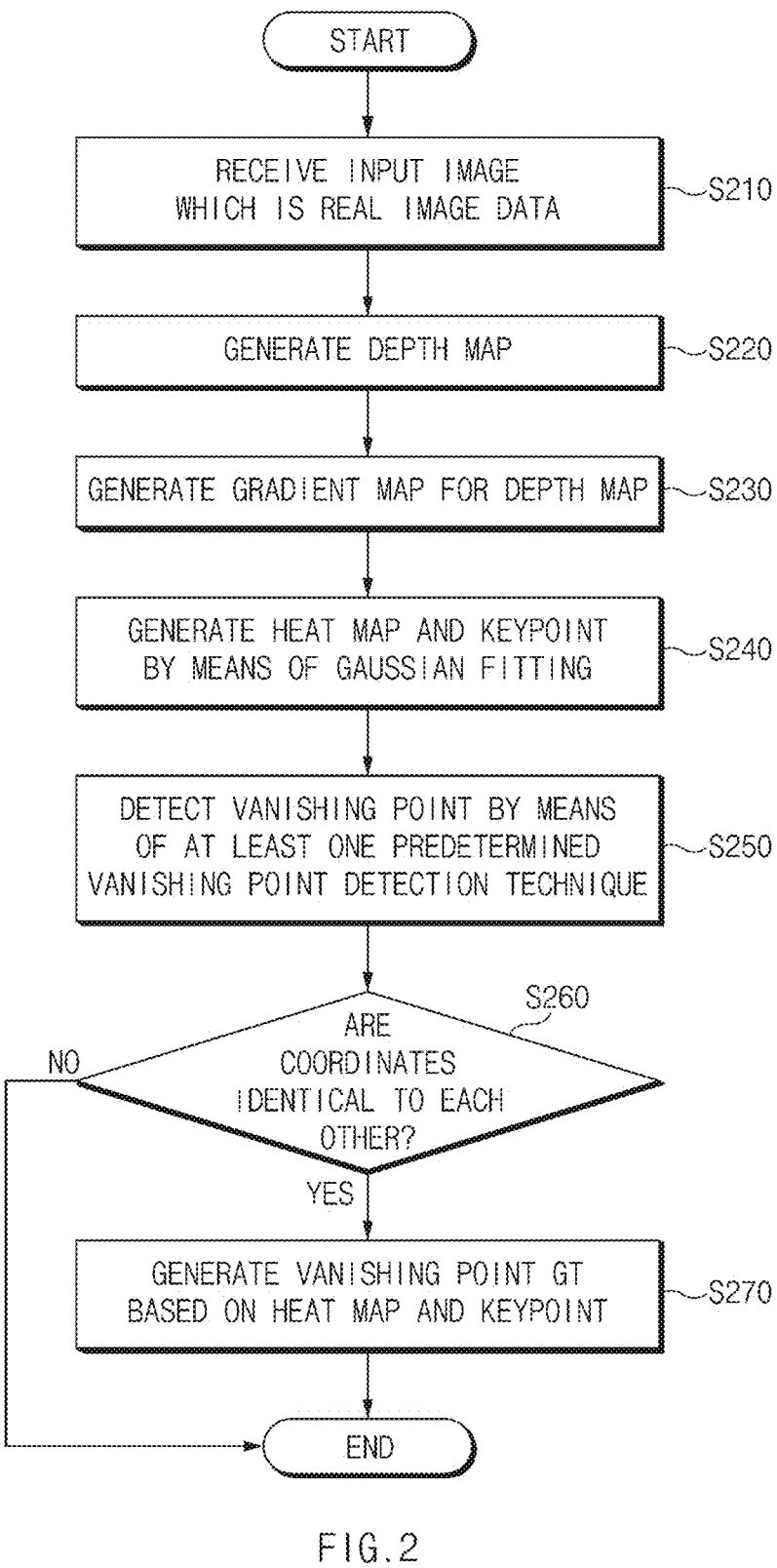
FIG. 2 illustrates an operational flowchart of a method for generating vanishing point ground truth (GT) according to an embodiment of the present disclosure.

FIG. 2 illustrates an operational flowchart of a method for generating vanishing point GT according to an embodiment of the present disclosure.

Referring to FIG. 2, in S210 and S220, the method for generating the vanishing point GT according to an embodiment of the present disclosure may receive an input image, which is real image data, and may generate a depth map or a depth image for the received input image.

Herein, in S220, the method for generating the vanishing point GT may generate a depth map in various manners for converting the input image into the depth map. Because the process of generating the depth map is apparent to those having ordinary skill in the art, a detailed description thereof has been omitted.

According to an embodiment, in S220, the method for generating the vanishing point GT may detect a dynamic object among objects included in the input image and may generate the depth map using the remaining area except for an area for the detected dynamic object, i.e., only an area for a static object. At this time, the dynamic object may be detected by an image analysis for detecting a predetermined dynamic object or a dynamic object detection network.

When the depth map for the input image is generated in S220, in S230, a gradient map for the depth map may be generated.

According to an embodiment, in S230, the method for generating the vanishing point GT may divide the depth map into meshes and may generate a gradient for each mesh. Thus, the gradient map for the depth map may be generated.

In the present disclosure, because the amount of pixel-by-pixel calculation is large in calculation using the depth, the gradient map for the depth map is generated to reduce the amount of calculation.

Herein, the process of generating the gradient map in the depth map may be performed by various schemes. Because such schemes are apparent to those having ordinary skill in the art, a detailed description thereof has been omitted.

When the gradient map is generated in S230, in S240, a heat map and a keypoint may be generated by means of Gaussian fitting.

Herein, in S240, the method for generating the vanishing point GT may generate a center point of 2D Gaussian as a keypoint corresponding to a vanishing point.

In S250, a vanishing point for the input image may be detected by means of various vanishing point detection techniques or various vanishing point tracking techniques, which are predetermined or predefined.

According to an embodiment, in S250, the method for generating the vanishing point GT may detect a vanishing point for the input image by means of each of a template matching (TM)-VDC technique, a line inference (LI)-VDC technique, and an optical flow technique.

The TM-VDC technique may crop an area where there is a vanishing point using a vanishing point tracking technique and may find an area identical to the cropped area in a next frame. Herein, it may be assumed that the TM-VDC technique uses a TM to find the identical area and the vanishing point is moved by the distance in which the cropped area is moved.

The LI-VDC technique may be a technique in which two parallel straight lines intersect with each other on an image and the intersection point is assumed as a vanishing point. The LI-VDC technique may detect lines, may fit the lines to straight lines, and may detect a point where the straight lines intersect with each other as a vanishing point.

The optical flow technique may be a technique for estimating a rotation matrix and transformation matrix (RT) between a previous frame and a next frame and assuming that a vanishing point is moved by the rotation matrix (R). The optical flow technique may detect optical flow and estimate RT using Epipolar geometry and may calculate an amount of vanishing point movement using R.

Although it is shown that S250 is performed after S240, S250 may be performed in parallel after receiving the input image.

When the vanishing point is detected by the Gaussian center point and each technique in S240 and S250, in S260, it is determined whether coordinates of the Gaussian center point and coordinates of the vanishing point detected by each technique are identical to each other. When it is determined that both the coordinates are identical to each other (YES in S260), in S270, vanishing point GT data may be generated using the heat map and the keypoint generated in S240.

The above-mentioned process is performed for each of pieces of real image data. As a result, when vanishing point GT data based on a real image is collected, the collected vanishing point GT data may be used as training data for training CenterNet.

Although it is described that the vanishing point GT data based on the real image is generated using the depth map for the input image in FIG. 2, it is not restricted or limited that the vanishing point GT data is generated using the depth map for the input image. Vanishing point GT data may be generated through a process of generating an optical flow map for the input image and generating a gradient map for the optical flow map.

Hereinafter, a description is given of a method for estimating a vanishing point for an image using CenterNet trained by means of 2D Gaussian learning using the vanishing point GT data based on the real image, which is generated through the process in FIG. 2, with reference to FIGS. 3-8.

Figure 3:
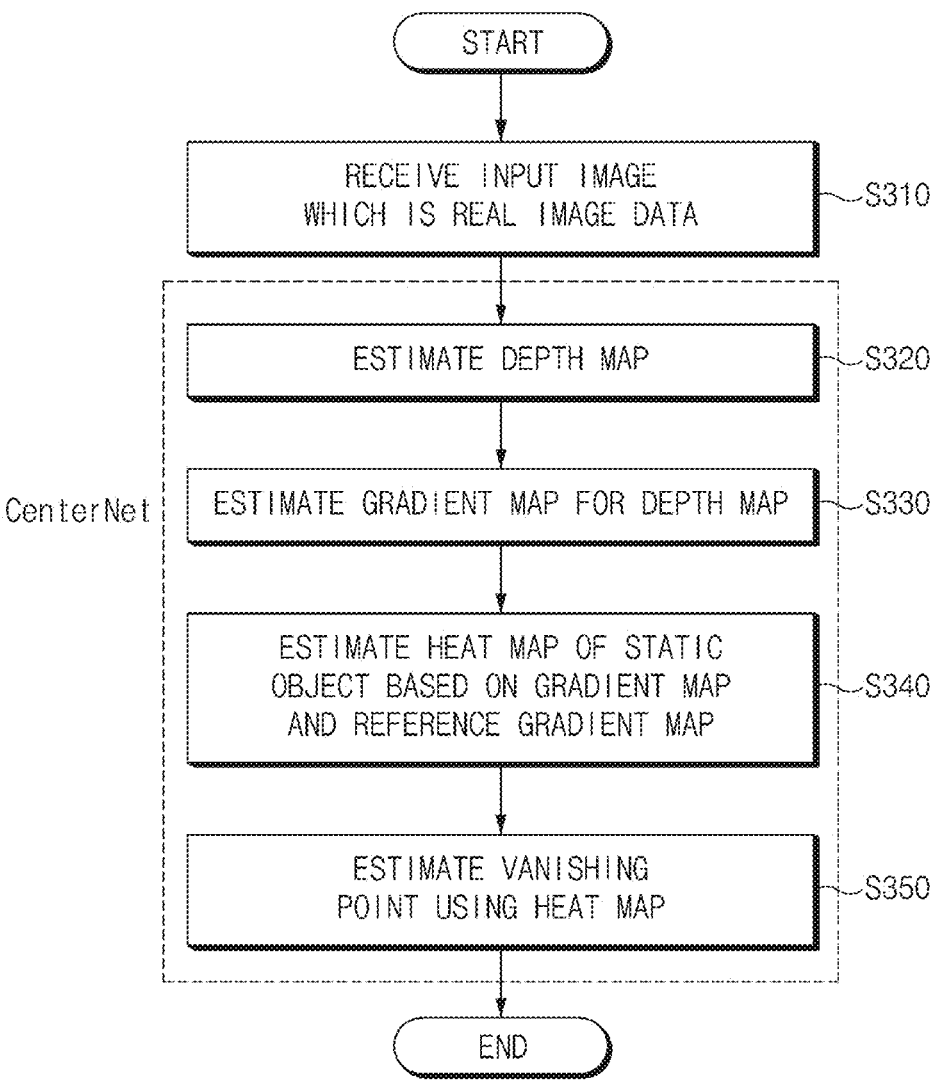
FIG. 3 illustrates an operational flowchart of a method for estimating a vanishing point according to another embodiment of the present disclosure.
Figure 4:
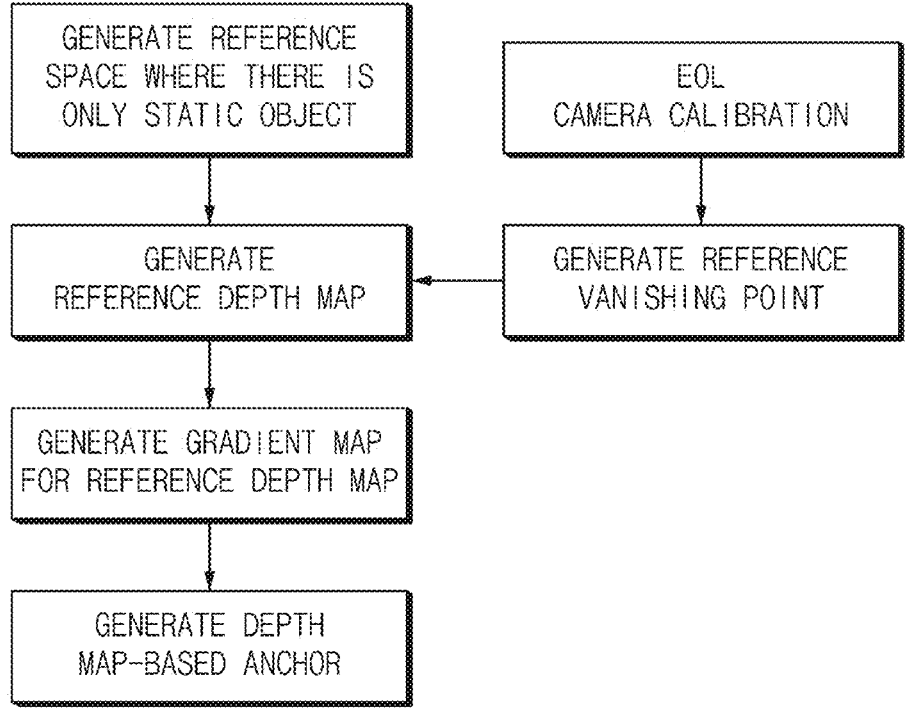
FIG. 4 illustrates an operational flowchart of an embodiment for a process of generating a reference gradient map.
Figure 5A:
FIGS. 5A and 5B illustrate an example for describing a scheme for estimating a vanishing point in a depth map.
Figure 5B:
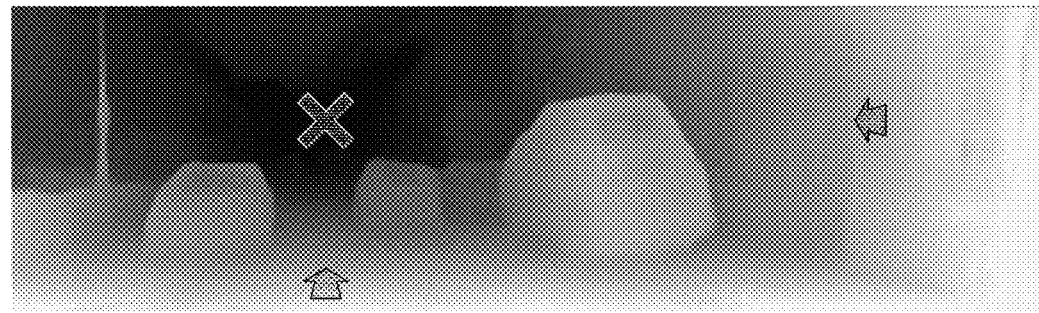
Figure 6A:
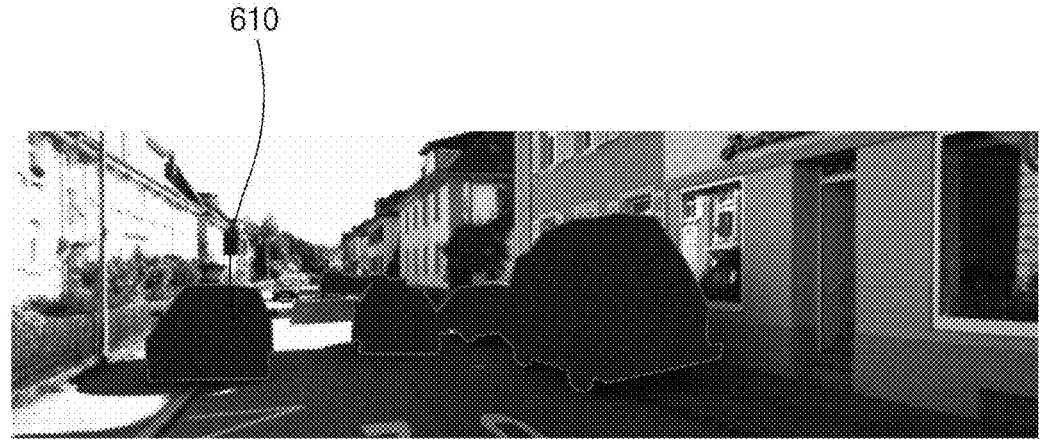
FIGS. 6A and 6B illustrate an example for describing a scheme for generating a depth map of a static object.
Figure 6B:
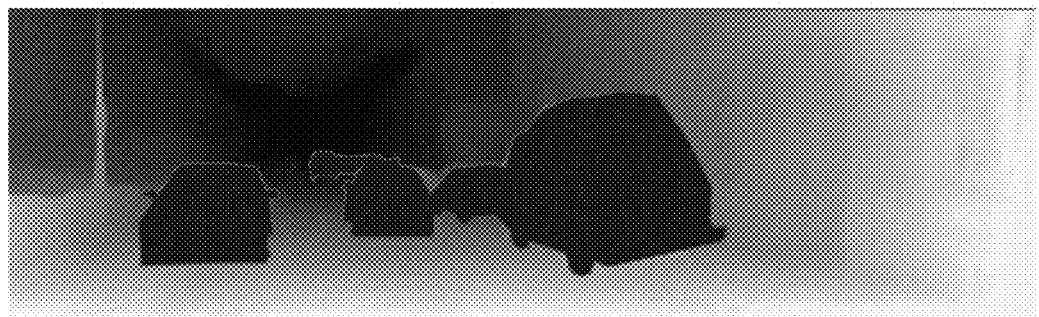
Figure 7A:
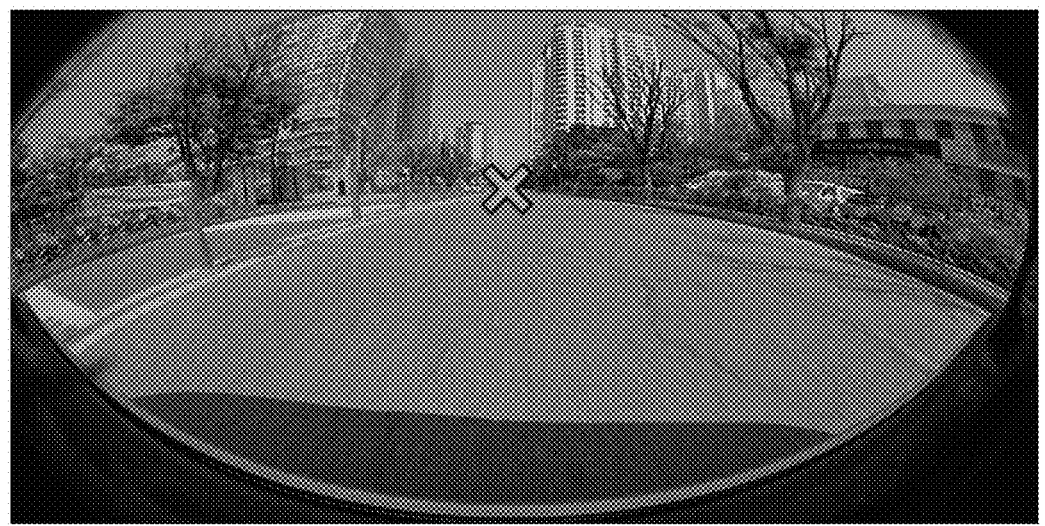
FIGS. 7A and 7B illustrate an example for describing a scheme for estimating a vanishing point in an optical flow map.
Figure 7B:
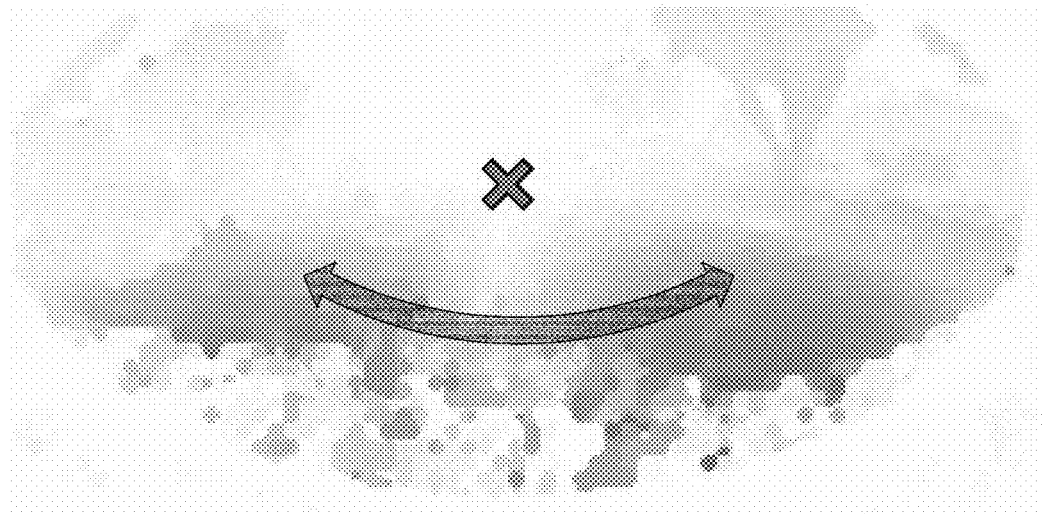

FIG. 3 illustrates an operational flowchart of a method for estimating a vanishing point according to another embodiment of the present disclosure. FIG. 4 illustrates an operational flowchart of an embodiment for a process of generating a reference gradient map. FIGS. 5A and 5B illustrate an example for describing a scheme for estimating a vanishing point in a depth map. FIGS. 6A and 6B illustrate an example for describing a scheme for generating a depth map of a static object. FIGS. 7A and 7B illustrate an example for describing a scheme for estimating a vanishing point in an optical flow map.

Referring to FIG. 3, the method for estimating the vanishing point according to another embodiment of the present disclosure may include a process (S310) of receiving an input image, which is real image data, and include processes (S320, S330, S340, and S350) of estimating a vanishing point for the input image using CenterNet trained by vanishing point GT data based on a real image.

According to an embodiment, in S310, the method for estimating the vanishing point may receive an image captured in real time by a camera provided in a vehicle, for example, an autonomous vehicle, a vehicle loaded with advanced driver assistant systems (ADAS), or the like, as the input image.

The processes (S320 and S330) of estimating the vanishing point for the input image using the CenterNet may estimate a depth map for the input image received in S310 and may estimate a gradient map for the estimated depth map.

As shown in FIG. 5A, when the input image is received, in S320, the method for estimating the vanishing point may estimate the depth map (FIG. 5B) for the received input image. When a road surface and a wall area (an arrow) are assumed as 2D Gaussian in the depth map in the technology of the present disclosure, a center point thereof may be a vanishing point X. Thus, the depth map may be estimated to estimate a vanishing point by means of the 2D Gaussian.

According to an embodiment, in S320, the method for estimating the vanishing point may detect a dynamic object from the input image and may estimate a depth map of the remaining area except for an area of the detected dynamic object to reduce an error in the estimation of the vanishing point, which is capable of being generated by the dynamic object. The method for estimating the vanishing point may improve the accuracy of estimating the vanishing point, in estimating the depth map. For example, to exclude the dynamic object area from the depth map, the dynamic object may be detected from the input image to exclude an area 610 of the detected dynamic object as shown in FIG. 6A. A depth map of only a static object in which the dynamic object area is excluded may be estimated as shown in FIG. 6B. Herein, the dynamic object may be detected by an object detection network for detecting the dynamic object and may be detected based on a segmentation mask for the dynamic object. Of course, the scheme for detecting the dynamic object is not restricted or limited to the above-mentioned scheme.

When the gradient map for the input image is estimated in S330, in S340 and S350, a heat map for the static object of the input image may be estimated based on the gradient map estimated in the CenterNet, and a predetermined or pre-defined reference gradient map and a vanishing point of the input image may be estimated using the estimated heat map.

According to an embodiment, in S350, the method for estimating the vanishing point may perform 2D Gaussian fitting of the heat map for the static object and may estimate a center point of Gaussian as the vanishing point by means of the Gaussian fitting.

In addition, the reference gradient map compared in S340 may be previously set and generated in various schemes and may be used in the CenterNet. A description is given of a process of generating the reference gradient map, for example, an anchor gradient map with reference to FIG. 4.

The process of generating the reference gradient map for the depth map may generate a reference space where there is only a static object, such as a rectangular tunnel, and may perform end-of-line (EOL) camera calibration to generate a reference vanishing point, as shown in FIG. 4.

The reference depth map may be generated based on the reference space and the reference vanishing point generated through the above-mentioned process, and the reference gradient map for the reference depth map may be generated to generate a depth map-based reference gradient map (or a depth map-based anchor).

As such, the method for estimating the vanishing point according to an embodiment of the present disclosure may generate the vanishing point GT of the real image data. The method for estimating the vanishing point may train the artificial intelligence network, for example, the CenterNet, which is the keypoint estimation network, using the vanishing point GT. The method for estimating the vanishing point may estimate the vanishing point for the input image using the CenterNet. Thus, the accuracy of estimating the vanishing point for the input image may be improved, and constraints may be resolved according to a driving environment by means of the improved accuracy.

Furthermore, the method for estimating the vanishing point according to an embodiment of the present disclosure may accurately estimate the vanishing point for the input image. Thus, the accuracy of estimating a posture of a camera provided in the vehicle may be improved.

Furthermore, the method for estimating the vanishing point according to an embodiment of the present disclosure may generate the vanishing point GT for the real image data and may train the keypoint estimation network, such as the CenterNet. Thus, the trained keypoint estimation network may be applied to estimate the vanishing point of the image in a real field.

In addition, the method for estimating the vanishing point according to an embodiment of the present disclosure is not restricted or limited to the depth map to estimate a vanishing point for an input image (FIG. 7A) based on an optical flow map (FIG. 7B) for the input image as shown in FIGS. 7A and 7B. At this time, in the optical flow map for the input image, as shown in FIG. 7B, a vector direction of optical flow may be expressed in color and strength of optical flow may be expressed in concentration. The vanishing point may be estimated using the CenterNet based on such an optical flow map like the depth map. Of course, to estimate the vanishing point based on the optical flow map, it is desirable to generate vanishing point GT data based on the optical flow map for real image data and train the CenterNet using the generated vanishing point GT data.

Furthermore, to estimate the vanishing point based on the optical flow map in the CenterNet, it is desirable to use an optical flow map-based anchor, rather than using the depth map-based anchor to generate the reference gradient map. In other words, when the optical flow map for the input image is estimated using the CenterNet and the optical flow map-based gradient map is estimated, the reference gradient map may be the optical flow map-based anchor. At this time, the process of generating the optical flow map-based anchor may generate a reference optical flow map based on a reference space and a reference vanishing point and may generate a reference gradient map for the reference optical flow map. Thus, an optical flow map-based anchor may be generated.

As described above, the method according to an embodiment of the present disclosure may estimate the vanishing point for the input image based on the optical flow map as well as estimating the vanishing point for the input image based on the depth map. In other words, the method of the present disclosure may be applied to the depth map-based image and may also be applied to the optical flow map-based image.

Figure 8:
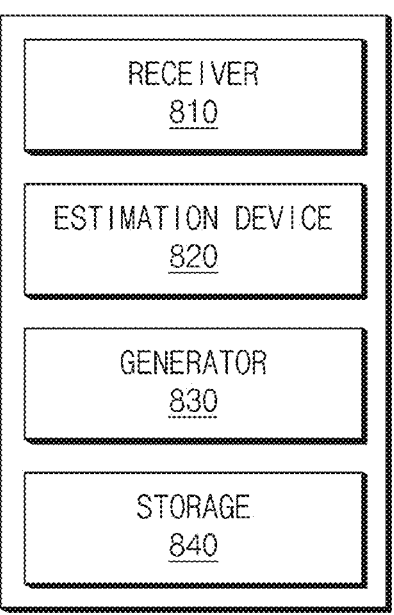
FIG. 8 illustrates a block diagram of an apparatus for estimating a vanishing point according to another embodiment of the present disclosure.

FIG. 8 illustrates a block diagram of an apparatus for estimating a vanishing point according to another embodiment of the present disclosure, which illustrates a block diagram of an apparatus for performing a method for performing a vanishing point in FIGS. 3-7B.

Referring to FIG. 8, an apparatus 800 for estimating a vanishing point according to another embodiment of the present disclosure may include a receiver 810, an estimation device 820, a generator 830, and storage 840.

The storage 840 may be a configuration means for storing all pieces of data associated with the technology of the present disclosure, which may store CenterNet or data such as a gradient map.

The receiver 810 may receive an input image to estimate a vanishing point.

According to an embodiment, the receiver 810 may receive an image captured in real time by a camera provided in a vehicle, for example, an autonomous vehicle, a vehicle loaded with driver assistant systems (ADAS), or the like, as the input image.

The estimation device 820 may estimate a vanishing point for the input image using CenterNet trained by vanishing point GT data based on a real image.

According to an embodiment, the estimation device 820 may estimate a depth map for the input image received in the receiver 810 using the CenterNet. The estimation device 820 may estimate a gradient map for the estimated depth map. The estimation device 820 may estimate a heat map for a static object of the input image based on the estimated gradient map and a predetermined reference gradient map. The estimation device 820 may estimate a vanishing point of the input image using the estimated heat map.

According to an embodiment, the estimation device 820 may detect a dynamic object from the input image and may estimate a depth map of the remaining area except for the detected dynamic object area to reduce an error in the estimation of the vanishing point, which is generated by the dynamic object. The accuracy of estimating the vanishing point may be improved.

The generator 830 may be a configuration means for generating a reference gradient map, which may generate a reference space where there is only a static object, such as a rectangular tunnel. The generator 830 may generate a reference vanishing point to generate a reference depth map or a reference optical flow map based on the reference space and the reference vanishing point. The generator 830 may generate a reference gradient map for the reference depth map or the reference optical flow map. Thus, a depth map-based reference gradient map or an optical flow map-based reference gradient map may be generated.

Herein, because the generator 830 is the configuration means for generating the reference gradient map used in the CenterNet, the reference gradient map is already generated and stored or is applied to the CenterNet, and the configuration means may be omitted or removed.

Although the description of the apparatus according to another embodiment of the present disclosure is omitted, the apparatus according to another embodiment of the present disclosure may include all contents described in the method of FIGS. 3-7B. This is apparent to those having ordinary skill in the technical field of the present disclosure.

Likewise, a method for generating vanishing point GT shown in FIG. 2 is implemented using the apparatus for generating the vanishing point.

Figure 9:
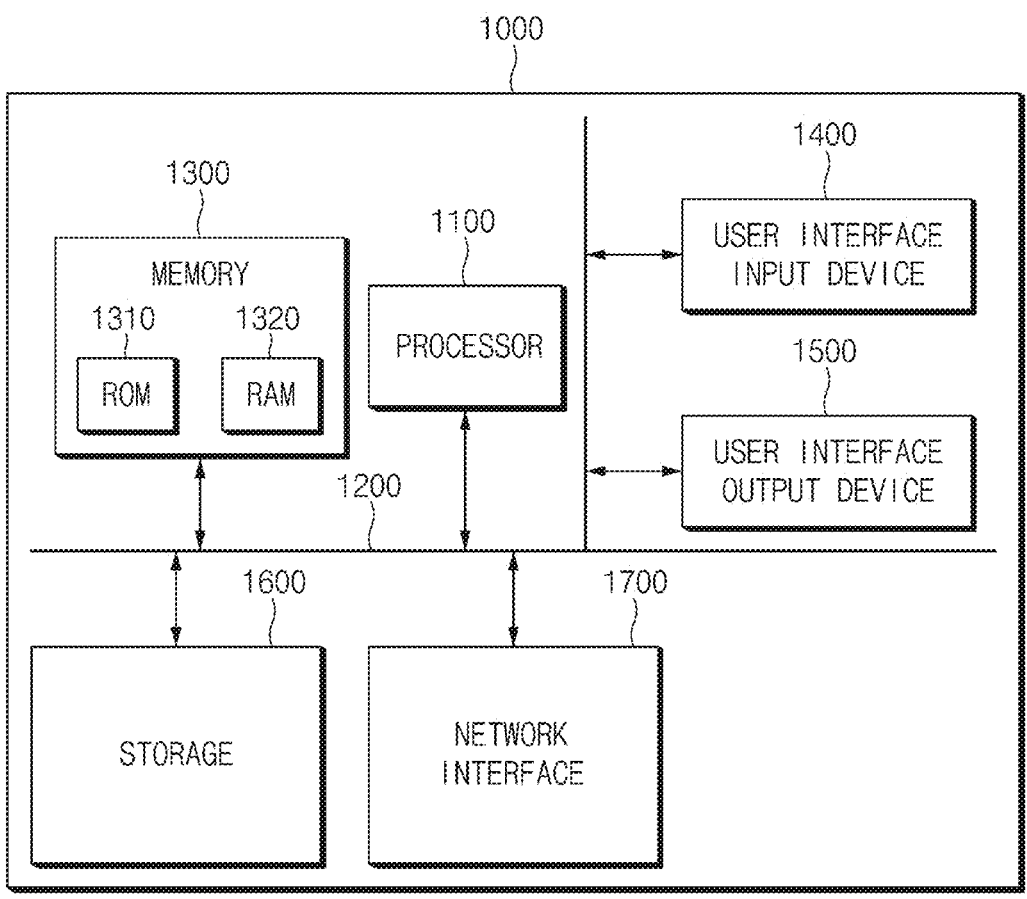
FIG. 9 illustrates a block diagram of a computing system for executing a method for estimating a vanishing point according to another of the present disclosure.

FIG. 9 illustrates a block diagram of a computing system for executing a method for estimating a vanishing point according to another of the present disclosure.

Referring to FIG. 9, the method for estimating the vanishing point according to another of the present disclosure, which is described above, may be implemented by means of a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320. Of course, a method for generating vanishing point GT according to an embodiment of the present disclosure is also implemented through the computing system of FIG. 9.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an EPROM, an EEPROM, a register, a hard disc, a removable disk, and a CD-ROM. The storage medium may be coupled to the processor 1100. The processor 1100 may read out information from the storage medium and may write information in the storage medium. Alternatively, the storage medium may be integrated with the processor 1100. The processor 110 and the storage medium may reside in an application specific integrated circuit (ASIC). The ASIC may reside within a user terminal. In another case, the processor 1100 and the storage medium may reside in the user terminal as separate components.

According to the present disclosure, the apparatus for estimating the vanishing point may generate vanishing point GT of real data and may train an artificial intelligence network, for example, CenterNet, which is a keypoint estimation network, using the vanishing point GT to estimate a vanishing point for an input image. Thus, the accuracy of estimating the vanishing point for the input image may be improved, and constraints may be resolved according to a driving environment.

According to the present disclosure, the apparatus for estimating the vanishing point may accurately estimate a vanishing point for an input image and thus may improve the accuracy of estimating a posture of a camera provided in a vehicle.

According to the present disclosure, the apparatus for estimating the vanishing point may generate vanishing point GT for real data and may train a network. Thus, the vanishing point GT may be applied to estimate a vanishing point in a real field.

The effects that are achieved through the present disclosure may not be limited to the effects described above. Other advantages s not described above may be more clearly understood from the following detailed description by those having skill in the art to which the present disclosure pertains.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims. Therefore, embodiments disclosed in the present disclosure are not intended to limit the technical spirit of the present disclosure. The scope of the technical spirit of the present disclosure is not limited by such an embodiment. The scope of the present disclosure should be construed on the basis of the accompanying claims, and all the technical ideas within the scope equivalent to the claims should be included in the scope of the present disclosure.

What is claimed is:

1. A method for estimating a vanishing point, the method comprising:

receiving an input image; and estimating a vanishing point for the input image, using an artificial intelligence network pre-trained by vanishing point ground truth (GT) data generated based on real image data, wherein estimating of the vanishing point includes estimating a depth map or an optical flow map for the input image, estimating a gradient map for the depth map or the optical flow map, estimating the vanishing point for the input image based on the gradient map and a predetermined reference gradient map, and generating the predetermined reference gradient map, wherein generating the predetermined reference gradient map includes generating a reference space where there is only a static object and a reference vanishing point, generating a reference depth map or a reference optical flow map based on the reference space and the reference vanishing point, and generating a gradient map for the reference depth map or the reference optical flow map to generate the predetermined reference gradient map.

2. The method of claim 1, wherein estimating the vanishing point includes estimating a heat map for a static object based on the gradient map and the predetermined reference gradient map and estimating the vanishing point based on the heat map.

3. The method of claim 2, wherein estimating the vanishing point includes performing two-dimensional (2D) Gaussian fitting of the heat map for the static object and estimating a center point of 2D Gaussian as the vanishing point.

4. The method of claim 2, wherein the artificial intelligence network includes a network for estimating a keypoint corresponding to the vanishing point in the heat map.

5. The method of claim 1, wherein estimating the depth map or the optical flow map includes:

detecting at least one predetermined dynamic object from the input image; and estimating a depth map of a static object except for an area of the detected at least one predetermined dynamic object, when estimating the depth map.

6. The method of claim 1, wherein the artificial intelligence network includes CenterNet.

7. The method of claim 1, wherein the vanishing point GT data is generated based on a heat map and a keypoint, when a depth map or an optical flow map for an image is generated, when a gradient map for the depth map or the optical flow map is generated, when the heat map for the gradient map is generated by means of Gaussian fitting of the gradient map and the keypoint is generated using a Gaussian center point by means of the Gaussian fitting, and when coordinates for the Gaussian center point are identical to coordinates of a vanishing point detected by at least one predetermined vanishing point detection technique.

8. An apparatus for estimating a vanishing point, the apparatus comprising:

a receiver configured to receive an input image;

a generator; and an estimation device configured to estimate a vanishing point for the input image, using an artificial intelligence network pre-trained by vanishing point GT data generated based on real image data, wherein the estimation device is configured to estimate a depth map or an optical flow map for the input image, estimate a gradient map for the depth map or the optical flow map, and estimate the vanishing point for the input image based on the gradient map and a predetermined reference gradient map, wherein the generator is configured to:

generate the predetermined reference gradient map;

generate a reference space where there is only a static object and a reference vanishing point;

generate a reference depth map or a reference optical flow map based on the reference space and the reference vanishing point; and generate a gradient map for the reference depth map or the predetermined reference gradient map to generate the predetermined reference gradient map.

9. The apparatus of claim 8, wherein the estimation device is further configured to estimate a heat map for a static object based on the gradient map and the predetermined reference gradient map and estimate the vanishing point based on the heat map.

10. The apparatus of claim 9, wherein the estimation device is further configured to perform 2D Gaussian fitting of the heat map for the static object and estimate a center point of 2D Gaussian as the vanishing point.

11. The apparatus of claim 9, wherein the artificial intelligence network includes a network for estimating a keypoint corresponding to the vanishing point in the heat map.

12. The apparatus of claim 8, wherein the estimation device is further configured to detect at least one predetermined dynamic object from the input image and estimate a depth map of a static object except for an area of the detected at least one predetermined dynamic object, when estimating the depth map.

13. The apparatus of claim 8, wherein the artificial intelligence network includes CenterNet.

14. The apparatus of claim 8, wherein the vanishing point GT data is generated based on a heat map and a keypoint, when a depth map or an optical flow map for an image is generated, when a gradient map for the depth map or the optical flow map is generated, when the heat map for the gradient map is generated by means of Gaussian fitting of the gradient map and the keypoint is generated using a Gaussian center point by means of the Gaussian fitting, and when coordinates for the Gaussian center point are identical to coordinates of a vanishing point detected by at least one predetermined vanishing point detection technique.

15. A method for generating vanishing point GT, the method comprising:

generating a depth map or an optical flow map for an input image;

generating a gradient map for the depth map or the optical flow map;

generating a heat map for the gradient map by means of Gaussian fitting of the gradient map and generating a keypoint using a Gaussian center point by means of the Gaussian fitting;

generating the vanishing point GT based on the heat map and a key point, when coordinates for the Gaussian center point are identical to coordinates of a vanishing point detected by at least one predetermined vanishing point detection technique;

receiving the input image; and estimating the vanishing point for the input image, using an artificial intelligence network pre-trained by the vanishing point GT data generated based on real image data, wherein estimating of the vanishing point includes estimating the depth map or the optical flow map for the input image, estimating the gradient map for the depth map or the optical flow map, estimating the vanishing point for the input image based on the gradient map and a predetermined reference gradient map, and generating the predetermined reference gradient map, wherein generating the predetermined reference gradient map includes generating a reference space where there is only a static object and a reference vanishing point, generating a reference depth map or a reference optical flow map based on the reference space and the reference vanishing point, and generating a gradient map for the reference depth map or the reference optical flow map to generate the predetermined reference gradient map.

* * * * *